(12) United States Patent
Garcia et al.

(10) Patent No.: US 7,311,028 B2
(45) Date of Patent: Dec. 25, 2007

(54) FRONT BEVEL INDICATOR/FRONT BEVEL LOCK

(75) Inventors: Jaime Garcia, Jackson, TN (US); Vance Roe, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 22 days.

(21) Appl. No.: 10/603,487

(22) Filed: Jun. 25, 2003

(65) Prior Publication Data

US 2006/0101970 A1   May 18, 2006

Related U.S. Application Data

(60) Provisional application No. 60/391,533, filed on Jun. 25, 2002.

(51) Int. Cl.
   *B26D 1/153* (2006.01)
(52) U.S. Cl. ............... 83/471.3; 83/473; 83/477.1; 83/581
(58) Field of Classification Search .......... 83/471, 83/471.3, 473, 581, 577.1, 577.2, 490, 522.15–522.17, 83/477.1, 477.2, 471.2, 472, 468.1–468.3; 30/388, 377; 144/286.1
See application file for complete search history.

(56) References Cited

U.S. PATENT DOCUMENTS

| 4,805,505 | A | * | 2/1989 | Cantlin ............... 83/468.6 |
| 5,249,879 | A | * | 10/1993 | Zoor ................ 403/374.5 |
| 5,829,333 | A | * | 11/1998 | Itzov ................ 83/471.3 |
| 6,067,885 | A | * | 5/2000 | Brunson et al. ........ 83/471.3 |
| 6,658,977 | B2 | * | 12/2003 | Chang ................ 83/490 |
| 6,662,697 | B1 | * | 12/2003 | Chen ................. 83/471.3 |
| 2003/0110914 | A1 | * | 6/2003 | Brazell et al. ......... 83/471.3 |
| 2003/0150311 | A1 | * | 8/2003 | Carroll et al. ......... 83/471.3 |

\* cited by examiner

*Primary Examiner*—Kenneth E. Peterson
*Assistant Examiner*—Phong Nguyen
(74) *Attorney, Agent, or Firm*—Adan Ayala (57) ABSTRACT

A gear and shaft assembly that translates the bevel of a power tool to an indicator more easily readable by an operator provides a front bevel indicator and locking mechanism. A locking mechanism is conveniently placed within reach of the operator and directly controls the motion of the gear assembly. The front bevel indicator may provide a higher resolution of the tilt angle by selection of the various gear ratios of the gears that translate the bevel position of the power tool mounted in the rear to the front of the mount of the power tool.

4 Claims, 8 Drawing Sheets

FRONT BEVEL INDICATOR/FRONT BEVEL LOCK

CROSS REFERENCE TO RELATED APPLICATIONS

This patent application claims priority under 35 U.S.C. 119(e) to U.S. provisional patent application Ser. No. 60/391,533, filed Jun. 25, 2002.

FIELD OF THE INVENTION

The present invention generally relates to the field of power tools, and particularly to a miter saw.

BACKGROUND OF THE INVENTION

Miter saws are power saws that have bevel housings to permit the saw blades to produce angled cuts. Most miter saws have a knob at the rear of the tool where the rotation of the bevel housing occurs that allows a user to lock the bevel of the saw blade. A scale mounted near the bevel housing measures the bevel. As the upper arm of the saw blade is rotated through 45-degree angle (single bevel version) or a 90-degree angle (dual bevel version), a pointer on the scale is moved through an identical amount of angular rotation.

The placement of the scale at the rear of the tool and the size of the scale makes it difficult to accurately read the tilt angle. Reaching to the back of the tool mounting to latch a bevel is inconvenient.

Therefore, it would be desirable to provide a miter saw having a front bevel indicator with a good resolution and to provide an easily accessible latch mechanism for setting the bevel.

SUMMARY OF THE INVENTION

Accordingly, the present invention is directed to a miter saw having a front bevel indicator and magnifier. The present invention may also be practiced with any tiltable power tool having a stationary mount.

The present invention relates to a scale magnifier for measuring the bevel of a tiltable mounted power tool, such as a miter saw. The power tool has a tiltable part on which the tool is positioned and a stationary part. The tilt of the tool is measured through a gear assembly that translates the tilt angle to an indicator on the other side of the stationary part. This placement of the indicator allows greater convenience in reading the angle. Also, the gear assembly may be used to scale up (or down) the resolution of the tilt angle.

Further, a handle near the indicator allows the tilt position to be locked in place. In the present invention, the indicator angular movement may be scaled with the angular movement of the tiltable part so that a higher (or lower) resolution of the tilt movement is displayed to an operator.

Because of the simple gear structure and placement of the bevel lock and indicator, the present invention offers a cost effective apparatus to aid a power tool operator to more precisely position the tool.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention presents a magnified bevel reading and a bevel lock of a miter saw within easy reach of an operator. The present invention may use two gear sets mounted on a transverse shaft 40, a pivot axis and a bevel scale axis to convert rotational movement of the miter saw to a scale at the front of the saw. A bevel lock handle may also be located at the front of the saw. This arrangement allows the user facility to both loosen or tighten the bevel lock within easy reach and read the resulting angle at the front with greater resolution.

Figure 1:
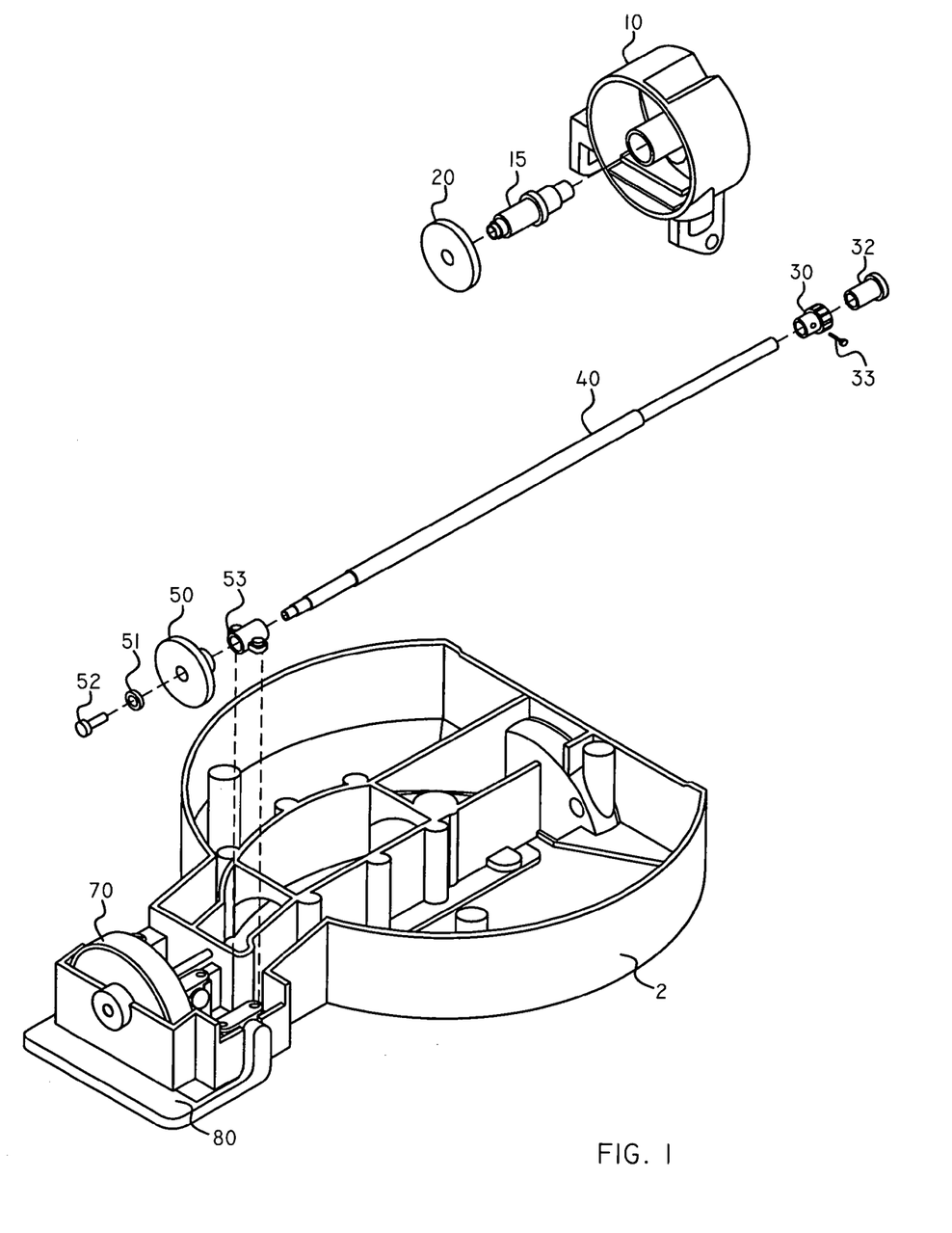
FIG. 1 illustrates an exploded view of the present invention.

FIG. 1 shows an exploded view of the principal features of the present invention. The component subassemblies of the present invention include a bevel measuring gear assembly, a translation assembly, and a front bevel indicator and lock assembly.

Figure 7:
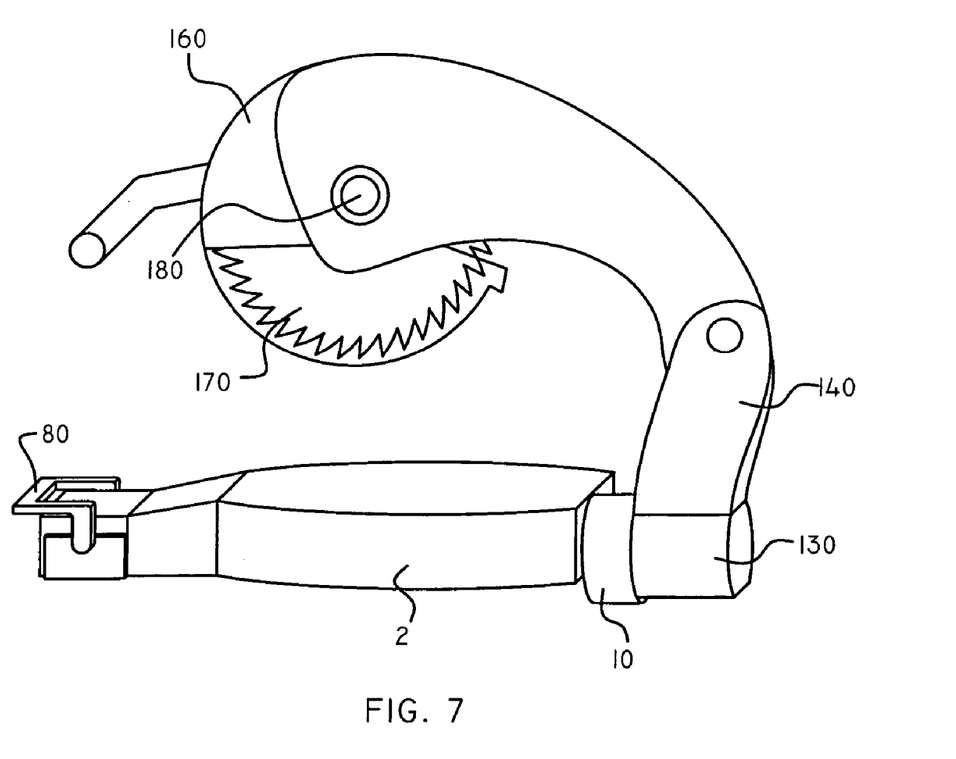
FIG. 7 illustrates a side view of a miter saw.

The bevel measuring gear subassembly includes a bevel housing 10 affixed to a miter base 2 (as shown in FIG. 7). The bevel housing has a central tubular portion for passing through a rear pivot axis shaft 15. At the end of the rear pivot axis shaft 15 is affixed a bevel measuring gear 20. The bevel measuring gear 20 may be affixed by a pin, may be welded to the end of the rear pivot axis shaft 15, or may be secured by other means.

The translation assembly includes a transverse shaft 40 that extends from the rear to the front of miter base 2. At the rear end of the transverse shaft 40, an input translation gear 30 is secured by securing means 32, 33. At the front end of the transverse shaft 40, an output translation gear 50 is secured by securing means, such as a pin 52 and washer 51. The output translation gear 50 connects to the transverse shaft 40 through a bushing 53 with wings. All components of the translation assembly are implemented so that any movement by a component causes the entire translation assembly to move in that manner.

The front bevel indicator and lock assembly includes a bevel indicator 70 (shown seated within an anterior portion of the miter base 2). The front bevel indicator and lock assembly includes a lock handle 80 that allows or suppresses movement of the indicator. The lock handle 80 is preferably lowered to actuate the locking mechanism and preferably, in an unlocked state, has the main body of the handle elevated above the pivot point in the housing. Alternatively, as shown in FIG. 1, the main body of the lock handle 80 may lie below the handle's pivot point.

Figure 2:
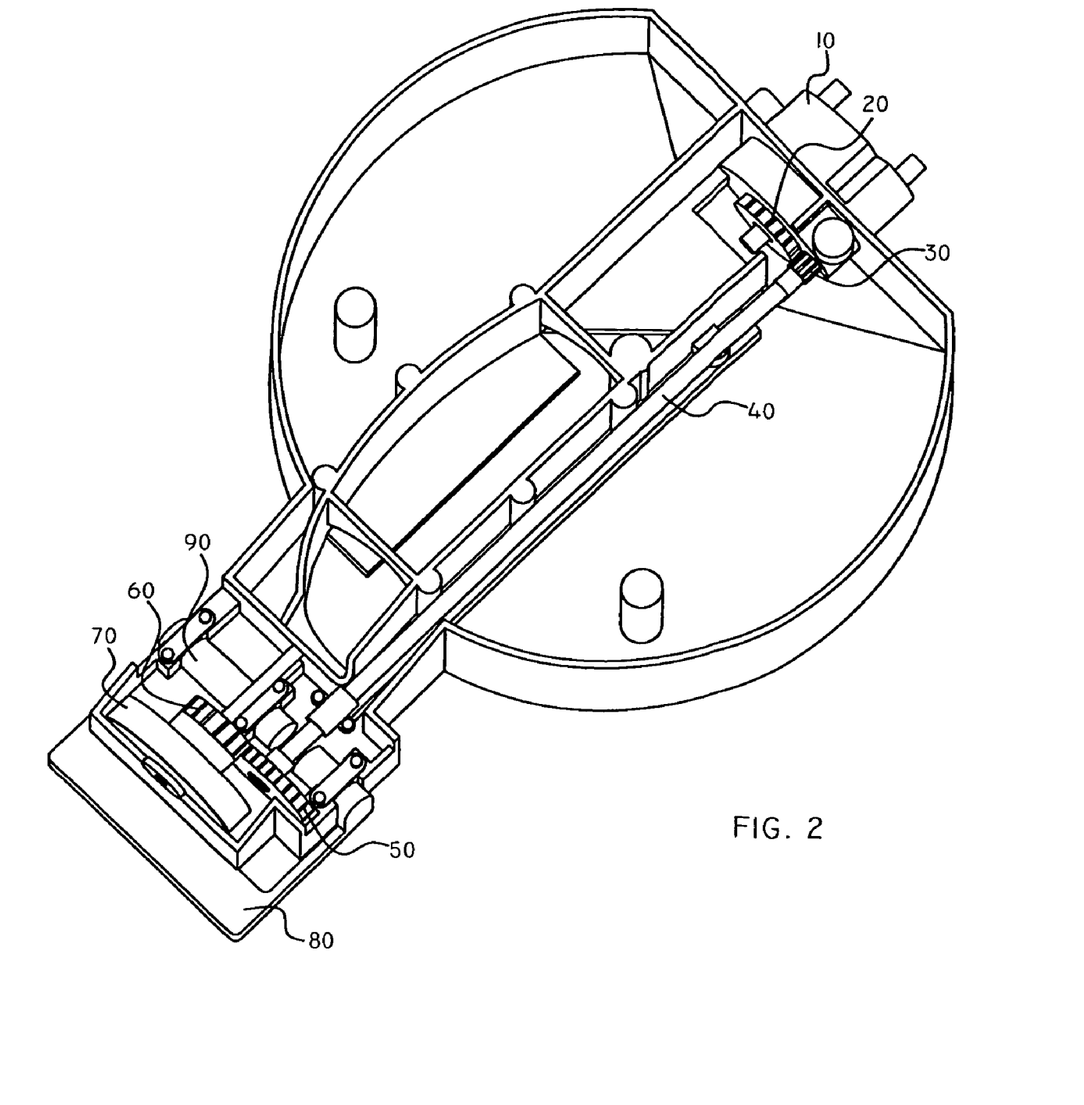
FIG. 2 illustrates a perspective view of the present invention.

FIG. 2 shows the component assemblies as they are mounted within miter base 2. As shown, tilt measuring gear 20 meshes with input translation gear 30. In similar fashion, output translation gear 50 meshes with bevel indicator gear 60. The miter is molded or otherwise processed to provide the channels and housing compartments to place and protect the various components.

Figure 3:
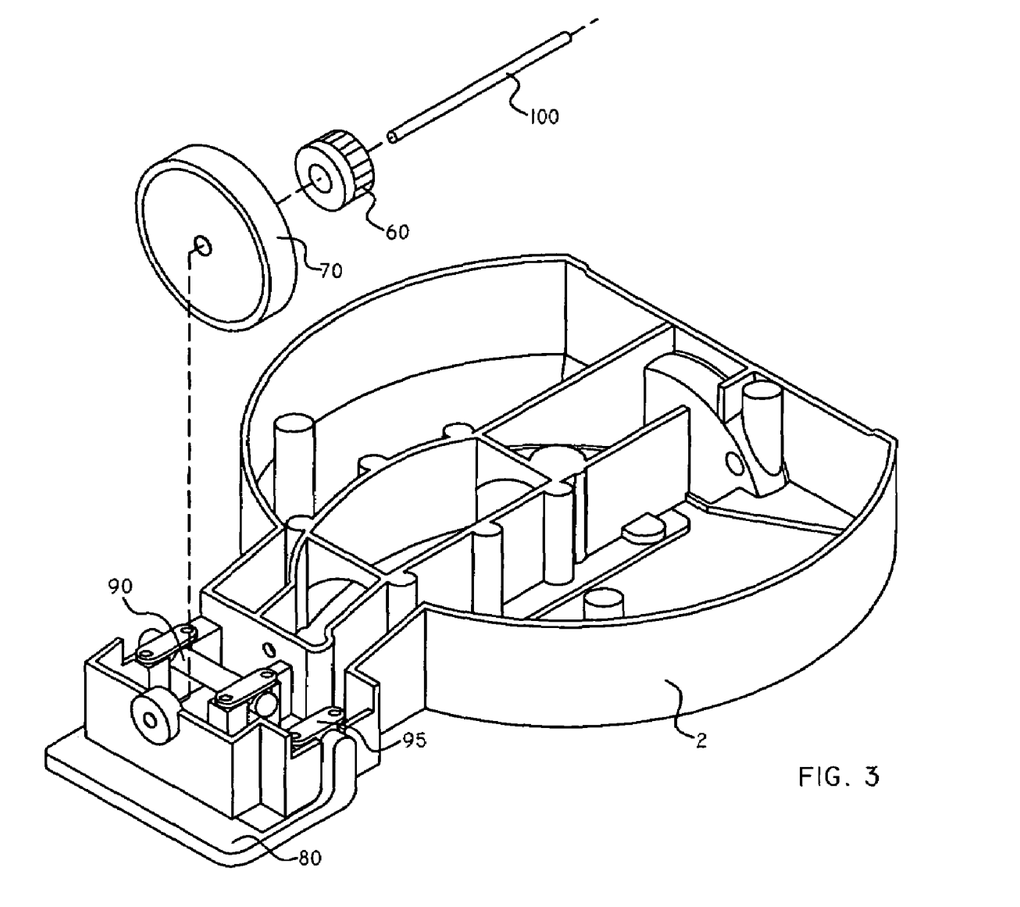
FIG. 3 illustrates an exploded view of the front bevel indicator assembly.

FIG. 3 illustrates an exploded view of the bevel indicator and lock assembly. The bevel scale indicator cylinder 70 and a bevel indicator gear 60 are fixedly attached to a short indicator shaft 100. The method of attachment may be by pins, welding, and the like. The bevel scale indicator cylinder 70, bevel indicator gear 60, and indicator shaft 100 are housed in a compartment at the front of the miter. The indicator shaft 100 is free to rotate, but may be prevented from rotating when the lock handle 80 is in the lock position.

Figure 4:
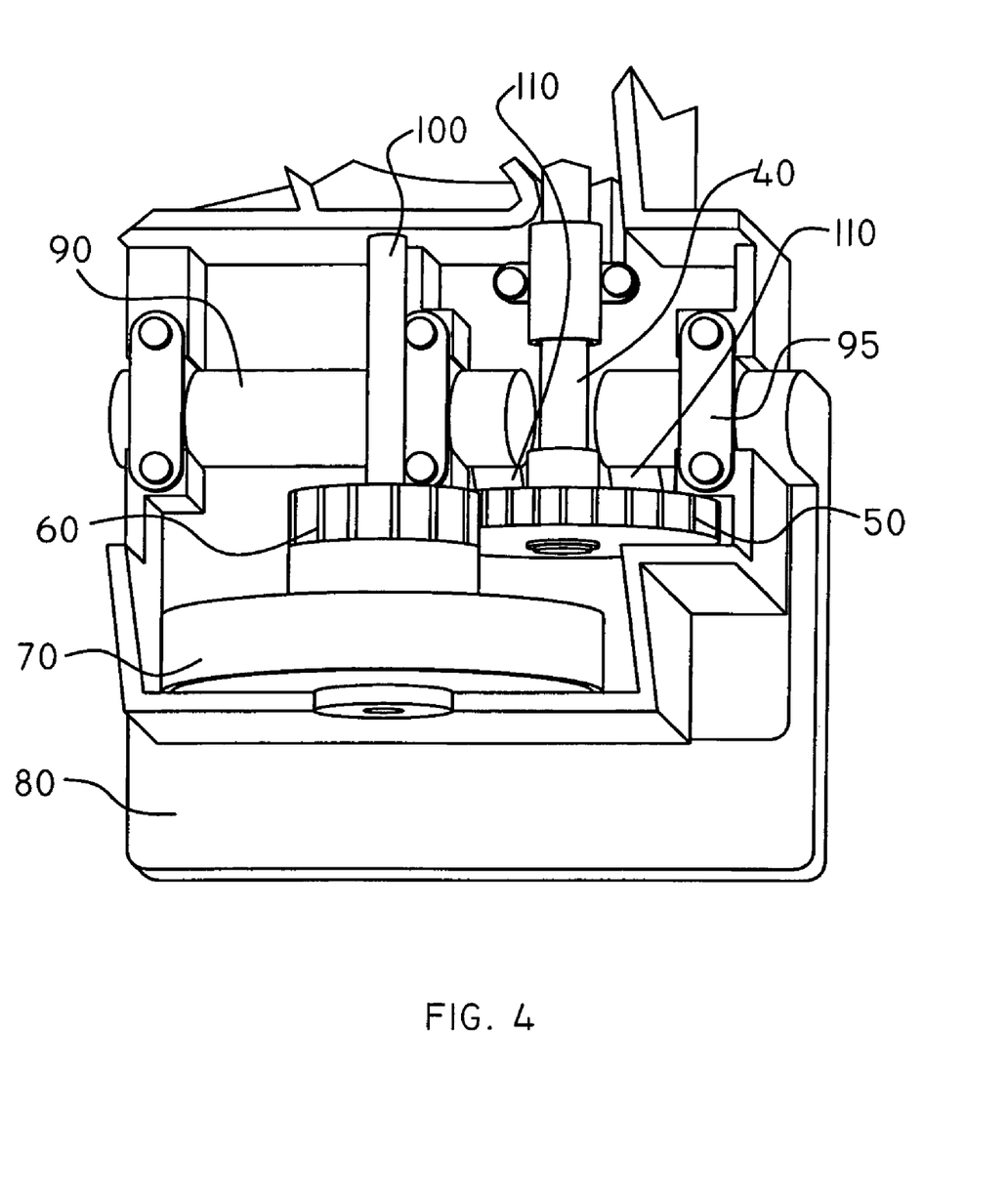
FIG. 4 illustrates the front bevel indicator assembly.

FIG. 4 illustrates a perspective view of the bevel indicator and lock assembly as mounted within the miter base 2. The arm 90 of the lock handle may have cammed surfaces 110 which contact the output translation gear 50 so as to prevent movement of the miter saw and the bevel indicator. Instead of having cammed surfaces 110 that contact the output translation gear 50, a shoulder may be placed on the arm 90 to contact the transverse shaft 40 and prevent motion. In the preferred embodiment, the bevel is locked by biasing the long rod 40 forward and clamping the bevel housing 10 against the table housing 2. The frictional force then holds the bevel housing in position. The rotation in the gears is used for the bevel indicator at the front. Alternatively, cammed surfaces 110 and/or shoulders may be placed on the arm 90 of the handle so as to prevent rotary motion of the indicator shaft 100 or bevel indicator gear 60. This lack of motion in bevel indicator gear 60 would be translated back through the rest of the gear system resulting in a locked bevel position. There may be some play in the gear system that may be rectified by a tensioning element such as a spring. In another embodiment, a rotary handle is used to cause a threaded bolt to contact the indicator shaft 100 or the transverse shaft 40 by screwing the threaded bolt to the shaft. An advantage of having a rotary handle for a threaded bolt is that the operator always knows the location of the handle. The handle itself may be star shaped, i.e., a handle from which three, four, or more projections radiate to aid the operator in gripping. Yet, alternatively, the handle with the threaded bolt may even contact the indicator cylinder directly to lock the bevel.

Figure 5:
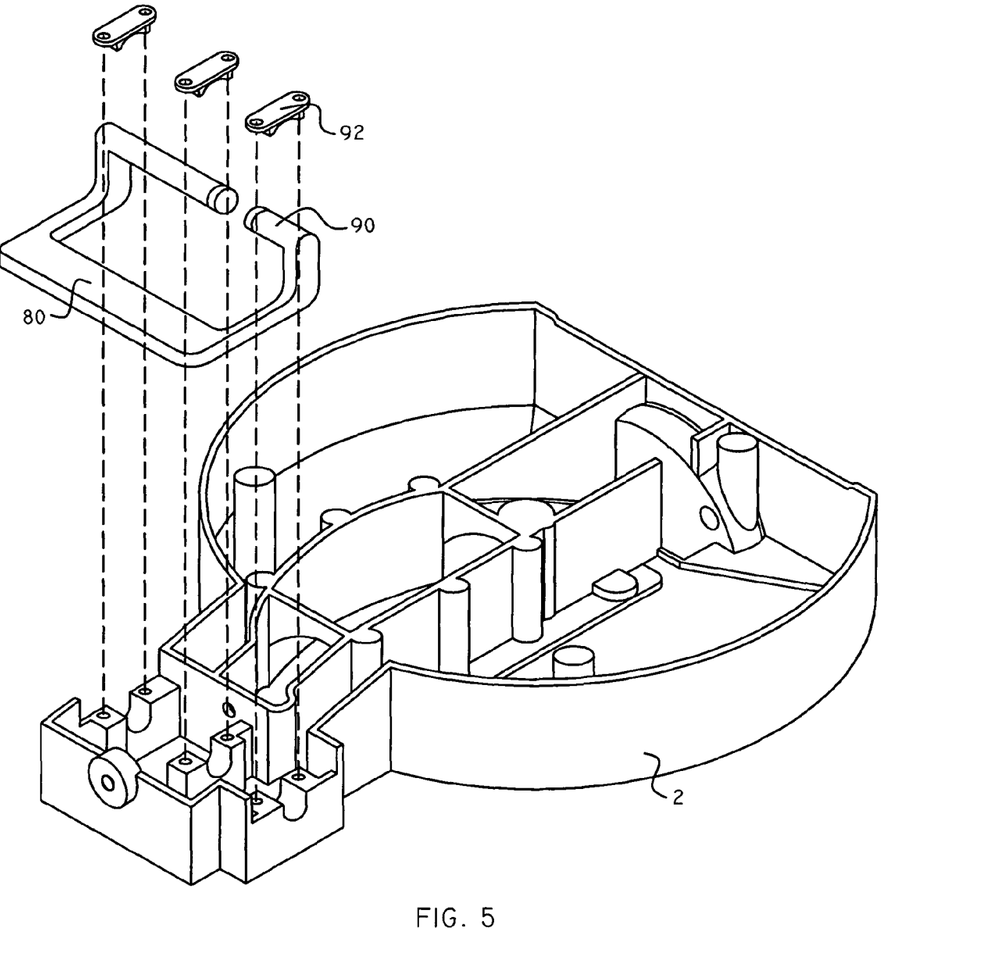
FIG. 5 illustrates an exploded view of the locking front bevel lock assembly.

FIG. 5 illustrates an exploded view of the lock assembly. This assembly includes a handle 80 that pivots about an arm or pair of arms 90. Arm 90 is retained within the indicator housing by brackets 92. The brackets may be secured by screws, bolts, and the like. The arms 90 may have cammed surfaces, shoulders, and/or other projecting portions (including pads) to make frictional contact with a gear or shaft of the bevel indicator and lock assembly and/or the translation assembly to prevent rotary movement. Placing the cammed surfaces and/or shoulders to contact the transverse shaft 40 and/or the output translation gear 50 may be advantageous to isolate gear play in the overall system.

Figure 6:
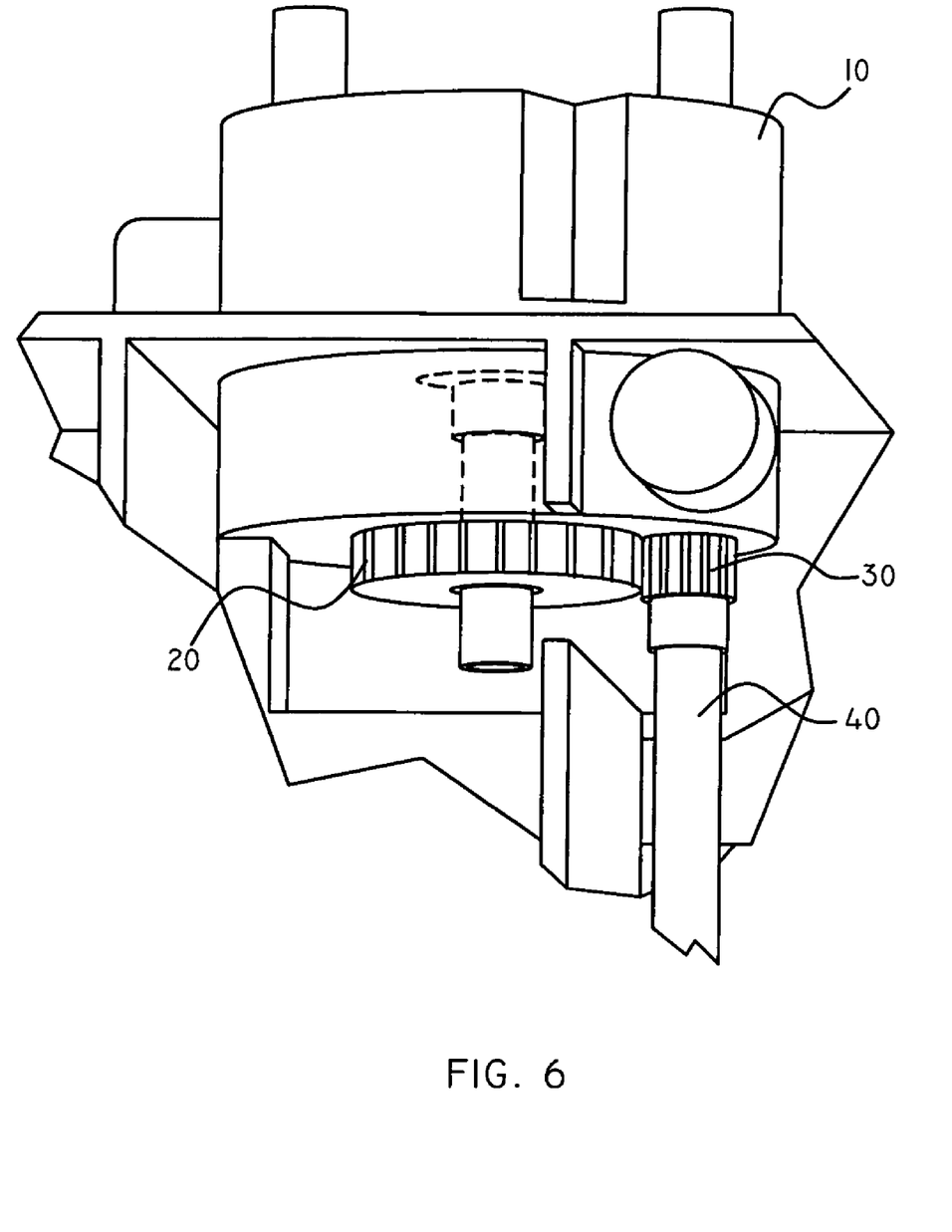
FIG. 6 illustrates the rear gear assembly of the present invention.

FIG. 6 shows a perspective view of the bevel measuring gear 20, output translation gear 30, and bevel housing 10 mounted on or within the miter base 2. At the center of the outside end of bevel housing 10 is a circular opening for attaching to the bevel or tiltable support for the miter saw (or other power tool).

FIG. 7 shows a side view of a miter saw. The saw blade 170 rotates about a shaft 180 supported by arm 140. A guard 160 protects the operator from the saw blade. Arm 140 pivots or tilts in unison with bevel or tiltable support 130. The bevel or tiltable support 130 fits against the bevel housing. The rear pivot axis shaft 15 controls the motion of the bevel or tiltable support 130. Variations of the support are contemplated by the present invention.

A bevel housing 10 is attached to and tiltable with respect to the stationary, mounting portion (miter). The bevel or tiltable support 130 may be latchably set at a variety of angles with respect to vertical. For example, the bevel or tiltable support 130 may be set zero degrees from a vertical orientation and 45 (or 90) degrees at a maximum tilt angle with respect to the vertical. The tilt may be set at gradations such as 5-degree increments or 1-degree increments, may have infinite adjustability within a set angular range, and the like as contemplated by a person of ordinary skill in the art.

Figure 8:
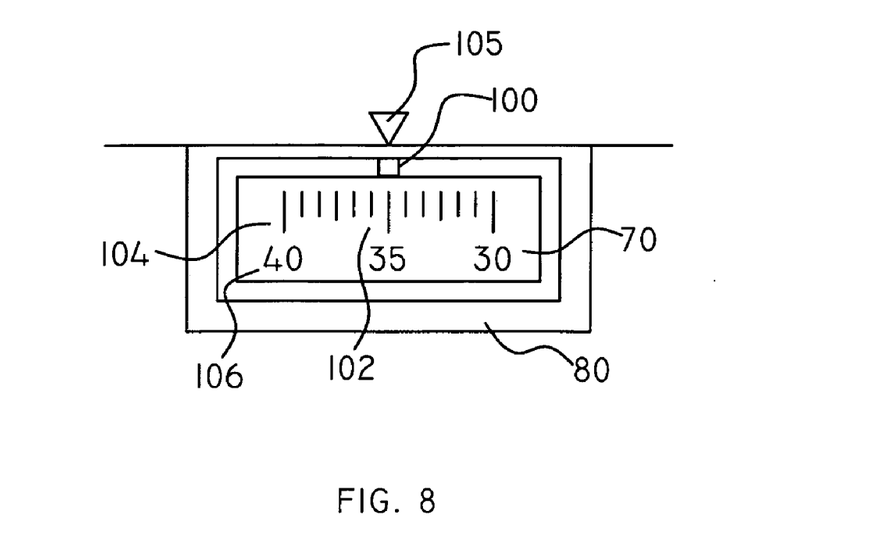
FIG. 8 illustrates an front bevel indicator.

As shown in FIG. 8, the bevel scale indicator cylinder 70 may include markings and/or a pointer on or proximate to the cylinder so as to present a measure of the rotational movement of the saw blade. As shown, major unit marks 104 and minor unit marks 102 are spaced upon the bevel scale indicator cylinder 70. Numeric indicia 106 may also be placed on the bevel scale indicator cylinder 70. A pointer arrow 105 is fixed on the miter base 2. Other variations are contemplated by the present invention.

The bevel scale indicator cylinder may be used as a scale magnifier. Scaling may be achieved through gear ratios in front only, gear ratios in back only, or gear ratios from both front and back. The gears 60 and 50 and gears 30 and 20 may be respectively scaled so that the motion of the tiltable portion of the machine is magnified appropriately in the motion of the bevel scale indicator cylinder 70 to provide a higher resolution to the user. As a result, when the transverse shaft 40 is unlocked and the upper arm is rotated, the rotation of the bevel housing 10 is translated and amplified through the transverse shaft 40 to the bevel scale indicator cylinder 70. For example, when the bevel housing rotates through 45 degrees, the bevel scale indicator cylinder 70 may rotate through about 292.5 degrees—6.5× amplification—while markings on or near the bevel scale indicator cylinder 70 show the true bevel position with respect to vertical. That is, although the bevel scale indicator cylinder may rotate 292.5 degrees when the bevel housing rotates through 45 degrees, the bevel scale indicator cylinder reading is 45 degrees. Amplification values, such as 4, 5, 10, and the like, may be used with the present invention. For certain applications, magnification values under 1, such as 0.5, may be used.

In the operation of the front bevel indicator, as the saw blade is rotated, tilt measuring gear 20 is actuated through the rear pivot axis shaft 15 of the bevel housing 10. As tilt-measuring gear 20 turns in response to the movement of the bevel housing 10, the gear 20 turns the input translation gear 30 in an opposite rotating direction. The rotation of input translation gear 30 causes transverse shaft 40 and output translation gear 50 to rotate. The indicator and locking mechanism transverse to the bevel housing 10 of the machine receive the rotary motion of the output translation gear 50 via measurement gear 60. The rotational direction of gear 60 corresponds to the rotational direction of tilt measuring gear 20 to provide the user with an intuitive sense in positioning the saw blade. As the measurement gear 60 turns, it causes the bevel scale indicator cylinder 70 to undergo an identical rotational motion.

Figure 9A:
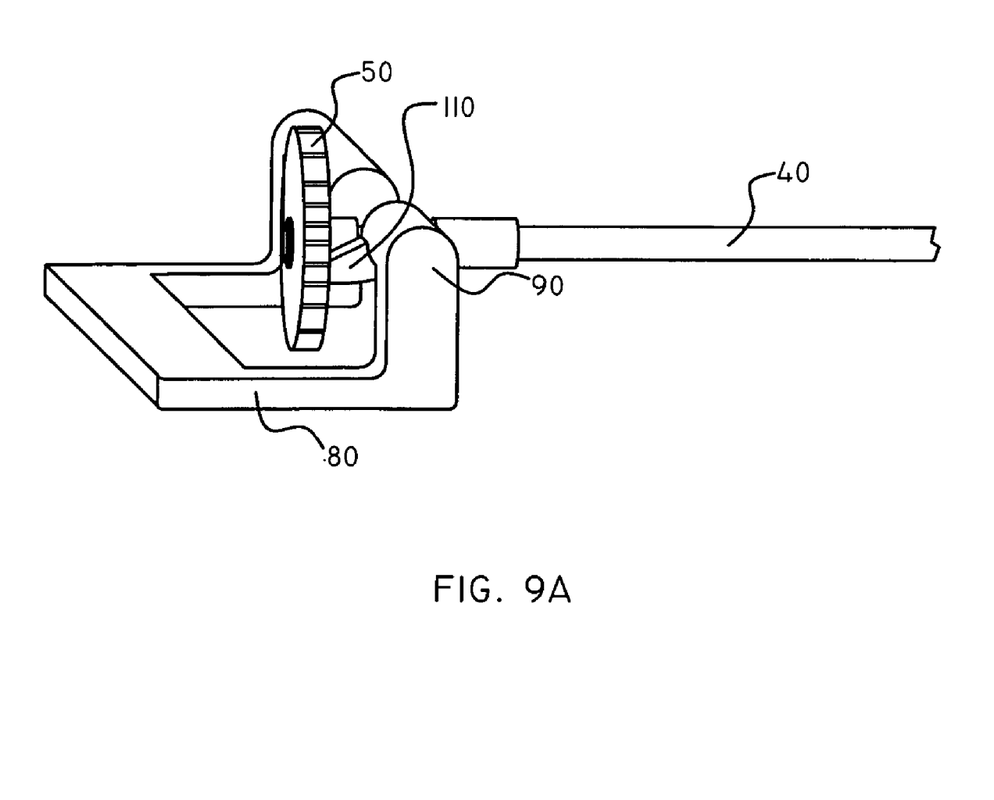
FIGS. 9A and 9B illustrate the operation of an embodiment of the front bevel lock.
Figure 9B:
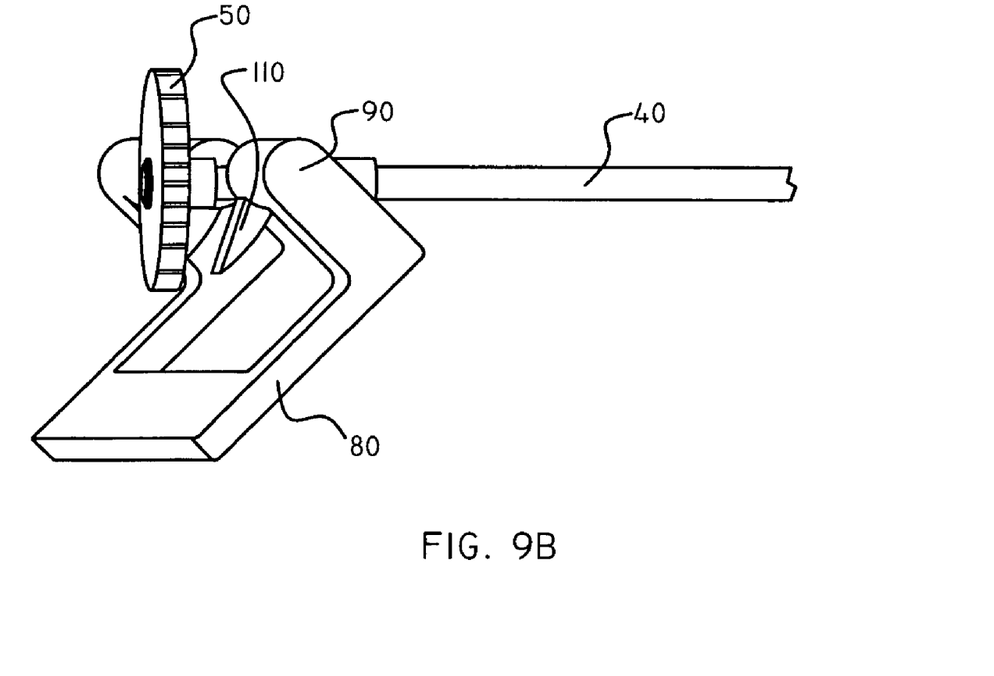

The operation of the lock mechanism is shown in FIGS. 9A and 9B. The user may actuate a handle 80 at the front of the tool in order to lock the bevel housing to the table (e.g., mounted eccentrically with respect to the pivot axis). An arm 90 of the handle engages the bevel scale axis shaft 100 to lock out motion or free the bevel or tiltable support 130 to rotate. In an embodiment, the transverse shaft 40 is used as a lock by pulling it forward (i.e., away from the front of the miter) via the cammed surfaces 110 on the arm 90 against output translation gear 50 so that transverse shaft 40 is placed in tension and is unable to rotate. In the unlocked or loose position, the transverse shaft 40 is allowed to rotate. While rotating, the bevel scale indicator cylinder 70 may display a higher (or lower or equal) resolution image. In summary, the user may lower (or raise) the lever (loosen the transverse shaft 40), rotate the upper arm to the desired position, and lower the lever to lock the bevel. The resulting bevel may be displayed on the scale at the front.

The present invention may be practiced with in various embodiments. In one embodiment, a gear and chain assembly may be used. In another embodiment, pulleys may be used instead of gears. In yet another embodiment, the scale magnifier provides a linear motion of a pointer or indicator bar to represent the bevel of the bevel housing. The linear measurement may be implemented by a bar having teeth on one side that mesh with output translation gear 50 so that the bar travels according to the rotation experienced by long shaft 40. More complex gear mechanisms may be used to provide further refinements of the invention. Additionally, instead of having short shafts and a long shaft, a single transverse shaft 40 may be directly driven by the bevel housing 10.

The present invention may, more generally, be used with a machine that has an operating portion tiltable with respect to a mounting portion. For example, the machine may be a beveled drill.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A miter saw having a moveable saw and a miter base, comprising:
    a miter base having a front portion and a rear portion, the front portion generally opposing the rear portion;
    a saw capable of attaining a plurality of bevel angles with respect to the miter base;
    a bevel housing disposed generally between the saw and the miter base;
    a lock handle pivotally mounted on the front portion of the miter base, the lock handle having a cam surface; and
    a rotatable shaft coupled to the lock handle, the rotatable shaft being arranged to be movable towards the front portion of the miter base and towards the rear portion,
    wherein movement of the lock handle results in the rotatable shaft being moved towards the front portion of the miter base so as to lock the bevel housing against the miter base to fix the saw in a particular bevel angle included in the plurality of bevel angles; and
    a gear being contained within the bevel housing, the gear being connected to the rotatable shaft such that rotation of the gear results in rotation of the shaft.

2. The miter saw of claim 1, further comprising a bushing mounted to the miter base adjacent the front portion, the bushing being arranged so as to retain the rotatable shaft while permitting rotation of the shaft.

3. The miter saw of claim 1, wherein the lock handle pivotally extends beyond the miter base when the bevel housing is not locked against the miter base.

4. The miter saw of claim 1, wherein the rotatable shaft is prevented from rotating when the bevel housing is locked against the miter base.

* * * * *